Nov. 20, 1923.
E. F. RANDALL
1,475,027
DETECTOR FOR WIRELESS SIGNALS
Filed June 7, 1922
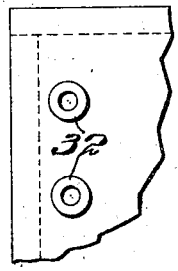
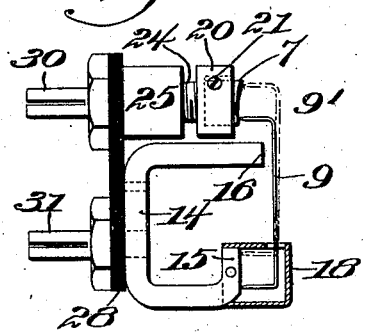
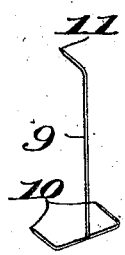
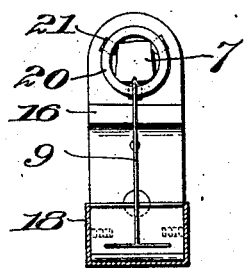
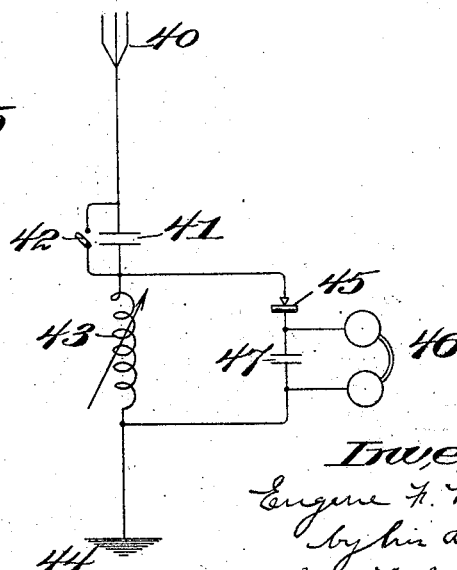
Witness
Jas. J. Maloney.
Inventor
Eugene F. Randall
by his attorneys
Van Everen, Fish, Hildreth, & Clay Patented Nov. 20, 1923.

1,475,027

UNITED STATES PATENT OFFICE.

EUGENE F. RANDALL, OF MEDFORD, MASSACHUSETTS, ASSIGNOR TO AMERICAN RADIO & RESEARCH CORPORATION, OF MEDFORD, MASSACHUSETTS, A CORPORATION OF DELAWARE.

DETECTOR FOR WIRELESS SIGNALS.

Application filed June 7, 1922. Serial No. 566,464.

*To all whom it may concern:*

Be it known that I, EUGENE F. RANDALL, a citizen of the United States, residing at Medford, in the county of Middlesex and State of Massachusetts, have invented certain new and useful Improvements in Detectors for Wireless Signals; and I do hereby declare the following to be a full, clear, and exact description of the invention, such as will enable others skilled in the art to which it appertains to make and use the same.

The present invention relates to detectors for wireless signals and more particularly to the type of detector involving the rectifying property of a sensitive crystal or mineral in contact with an electrically conducting member.

The object of the present invention is to provide an improved form of detector apparatus of the crystal type employing a magnetic field for maintaining the desired pressure engagement between the detector member and co-operating contact member.

With this object in view one feature of the invention contemplates the employment of a conducting member of magnetic material having a freely slidable engagement at one end with a smooth supporting surface and engaged in small area contact at its opposite end with a sensitive detector member and a magnetic pole located between the opposite ends of the conducting member and designed to maintain the conducting member in engagement with the detector member through the attraction exerted by the magnetic field. In the simplest and most efficient form of the invention which has yet been devised a sensitive detector is located in proximity to a substantially U-shaped magnet in such a position that a conducting member may be supported at one end on one of the poles of the magnet and at its opposite end upon the detector member, the second pole of the magnet being arranged to maintain the engagement between the conductor member and the detector member through magnetic force.

This form of detector has been found to possess the advantage of a high degree of stability; that is, it is not easily shaken out of sensitive adjustment by the action of shocks and jars. In my improved detector it has been found unnecessary to resort to the resilient and easily flexible contact members of the prior art which were only partially successful, because the stability of this detector seems to arise by virtue of the action of the magnetic field.

In the drawings Fig. 1 is an elevation of a detector embodying the features of my invention; Fig. 2 is a plan view of the apparatus shown in Fig. 1; Fig. 3 is a detail of the conducting contact member; Fig. 4 is a view illustrating the manner of mounting the detector upon the panel; and Fig. 5 is a diagram of a simple and efficient wireless receiving circuit embodying a crystal detector.

As shown in Figs. 1 and 2, this invention comprises a sensitive crystal or mineral 7, such as galena, in contact with a metallic member 9 of magnetic material, the other end of the member 9 being supported on a pole face 15 of a permanent magnet 14 which has a second pole 16 interposed between the pole 15 and crystal 7.

The member 9 is conveniently constructed in the form of a tripod having two closely spaced points of support 10 adapted to rest upon the pole face 15, the third point of support 11 being drawn into contact with the crystal 7 by means of the pole 16. This tripod may be formed from wire of magnetic material, which is fine enough to give light contact with the crystal 7 but is not necessarily so fine as to be bent under the action of the magnetic field or distorted in shape when manually moved about. The point 11 should be fairly sharp in order to give the requisite small area of contact with the crystal, and points 10 are also sharpened in order that there may be no appreciable frictional or magnetic drag upon the member 9 to interfere with easy manual lateral movement of the points 10 over the pole face 15. The pole face 15 is surrounded by a slotted housing 18 of non-magnetic material for the purpose of retaining the end of the member 9. The crystal 7 is held in a metallic cup 20 preferably by set screws 21 having a comparatively large area of contact with the crystal. The cup 20 engages by means of a screw thread 24 with a bushing 25.

It will be seen that this form of detector affords quick and easy adjustment both as regards the finding of the most sensitive spots on the crystal and the obtaining of the desired pressure of contact. By rotating the cup 20, the magnetic air gap is varied, thus varying the pressure of contact. As previously stated, the member 9 may be easily moved about so that the point 11 may be allowed to contact with different parts of the crystal surface. A second position of the member is shown in dotted lines at 9'.

The bushing 25 and magnet 14 serve as convenient means for bringing electrical connections to the crystal 7 and member 9 respectively. The entire assembly may according to the usual construction be mounted upon a suitable insulating base, indicated at 28. In the preferred form of the apparatus, terminal posts 30 and 31 are provided to make electrical connection with the bushing 25 and magnet 14 respectively. These terminal posts are adapted to engage with bushing 32 inserted in the panel of a wireless receiving set, as indicated in Fig. 4. This construction allows the detector to be readily inserted and removed to allow of quick interchange from one type of circuit to another.

The simple receiving outfit shown in Fig. 5 comprises an antenna 40 connected through a variable inductance 43 to ground 44. In the antenna circuit may be included a condenser 41 for the reception of short waves. For the reception of long waves this condenser is conveniently shunted by means of a switch 42. Shunted around the inductance 43 are a crystal detector, such as that described above, telephones 46 and a by-pass condenser 47. The crystal detector 45 acts as a rectifier for the high frequency oscillations, allowing the signals to be indicated by telephones 46.

I claim—

1. A detector for wireless signals comprising a sensitive crystal, a magnetic pole located at a distance removed from the crystal, a conducting contact member of magnetic material having an end in engagement with the surface of the crystal and an end supported in firm and easily slidable contact upon the magnetic pole, and magnetic means interposed between the pole and the crystal for maintaining the conducting member in pressure engagement with the crystal.

2. A detector for wireless signals comprising a sensitive crystal, a magnetic pole located at a distance removed from the crystal and in substantially the same plane as the surface of the crystal, a conducting contact member formed from a light wire of magnetic material having points of support of small area upon the surface of the crystal and the pole face, and magnetic means interposed between the pole and the crystal for maintaining the conducting member in pressure engagement with the crystal.

3. A detector for wireless signals comprising a sensitive detector member, a conducting contact member of magnetic material engaged at one end with the surface of the detector member, a magnet having two poles one of which serves as a support for the opposite end of the contact member, the second pole being arranged in proximity to the contact member between the ends thereof to maintain the contact member in engagement with the detector member.

4. A detector for wireless signals comprising a conducting contact member of magnetic material, a magnetic pole upon which one end portion of the contact member rests in freely slidable engagement, a sensitive detector member, a second magnetic pole supported between opposite ends of the contact member and designed to maintain the end of the contact member in engagement with the detector member, and means for supporting the detector member having provision for adjustment to vary the position of the detector member with respect to the second magnetic pole.

5. A detector for wireless signals comprising a sensitive detector member, a metallic surface located at a distance therefrom, a conducting contact member consisting of a tripod formed from wire of magnetic material having two points of support in engagement with the metallic surface, and magnetic means interposed between the metallic surface and the detector member for maintaining the third point of support of the conducting member in contact with the detector member.

6. A detector for wireless signals comprising a sensitive detector member, a U-shaped magnet supported adjacent thereto, a contact member of magnetic material having opposite ends engaged in contact with a detector member and one pole of the magnet respectively, the second pole of the magnet being arranged in proximity to the contact member and designed to maintain the latter in engagement with the detector member.

7. A detector for wireless signals comprising a sensitive crystal, a magnet having a pole at a distance from the crystal and a second pole adjacent the crystal, a conducting contact member formed from magnetic material having an end in engagement with the surface of the crystal and an end supported in firm and small area contact upon the first pole of the magnet, the second pole being adapted to maintain the conducting member in pressure contact with the crystal.

8. A detector for wireless signals comprising a sensitive detector member, a conducting contact member of magnetic material engaging at one end with the detector member, a magnetic pole having a freely slidable engagement with the opposite portion of the contact member, means for maintaining the contact member in place on the magnetic pole, a second magnetic pole supported and arranged to exert a force upon the contact member and maintain the latter in engagement with the detector member.

9. A detector for wireless signals comprising a sensitive detector member, a conducting member of magnetic material having an end in engagement with the detector member and a free end, means for supporting the free end portion in good electrical contact, and magnetic means interposed between the supporting means and the detector member for maintaining the conducting member in pressure engagement with the detector member.

10. A detector for wireless signals comprising a sensitive crystal, a conducting member of magnetic material having a straight portion and angularly directed portions of smaller length at either end of the straight portion, magnetic means adjacent the crystal for maintaining one of the end portions in pressure engagement with the surface of the crystal and means for supporting the end of the conducting member remote from the crystal in easily slidable electrical contact.

11. A detector for wireless signals comprising a crystal detector member, an insulating base, means for adjustably supporting the detector member on the base, a U-shaped magnet secured to the base on one side of the detector support, a conducting contact member of magnetic material having an angularly bent portion at one end which engages in small area contact with the crystal detector member and the opposite end portion engaging with the supporting surface of one of the magnet poles, the second pole of the magnet being arranged in proximity to the contact member between its ends to maintain one end in engagement with the crystal, and a retaining member adjacent the supporting surface of the magnet pole and loosely surrounding the contact member to retain the latter in position.

EUGENE F. RANDALL.